(12) United States Patent
MacDonald et al.

(10) Patent No.: US 8,881,463 B2
(45) Date of Patent: Nov. 11, 2014

(54) WEATHER STRIP SEAL FOR AN AUTOMOTIVE VEHICLE, AND ITS MANUFACTURING METHOD

(75) Inventors: Paul MacDonald, Dover, NH (US); David Castle, Nottingham, NH (US); Kevin Klemarczyk, Newfields, NH (US); Morgan Mills, Madbury, NH (US)

(73) Assignee: Hutchinson Sealing Systems, Auburn Hills, MI (US)

( * ) Notice: Subject to any disclaimer, the term of this patent is extended or adjusted under 35 U.S.C. 154(b) by 0 days.

(21) Appl. No.: 13/555,627

(22) Filed: Jul. 23, 2012

(65) Prior Publication Data

US 2013/0026717 A1 Jan. 31, 2013

Related U.S. Application Data

(60) Provisional application No. 61/512,146, filed on Jul. 27, 2011.

(51) Int. Cl.
*E06B 7/16* (2006.01)
*B60J 10/00* (2006.01)
*B60J 10/04* (2006.01)

(52) U.S. Cl.
CPC ............ *B60J 10/041* (2013.01); *B60J 10/0005* (2013.01); *B60J 10/0065* (2013.01); *B60J 10/0011* (2013.01); *B60J 10/0014* (2013.01)
USPC ........... 49/493.1; 49/377; 49/475.1; 49/495.1

(58) Field of Classification Search
USPC ................ 49/475.1, 492.1, 493.1, 495.1, 377
See application file for complete search history.

(56) References Cited

U.S. PATENT DOCUMENTS

| | | | |
|---|---|---|---|
| 3,904,569 A * | 9/1975 | Hekal et al. .................... | 523/100 |
| 4,442,156 A * | 4/1984 | Yamaguchi .................... | 428/142 |
| 4,916,008 A * | 4/1990 | Katayama et al. ............. | 428/205 |
| 5,463,831 A * | 11/1995 | Shinagawa et al. ............. | 49/377 |
| 6,217,807 B1 * | 4/2001 | Miyakawa et al. ....... | 264/171.14 |
| 6,422,571 B1 | 7/2002 | Keeney et al. | |
| 7,484,287 B2 * | 2/2009 | Tamura .......................... | 29/451 |
| 2010/0011671 A1 * | 1/2010 | Gentemann .................. | 49/489.1 |
| 2012/0110916 A1 * | 5/2012 | Gopalan et al. .............. | 49/475.1 |

* cited by examiner

*Primary Examiner* — Katherine Mitchell
*Assistant Examiner* — Catherine A Kelly
(74) *Attorney, Agent, or Firm* — Alston & Bird LLP

(57) ABSTRACT

A weather strip seal is provided for sealing between first and second structures, and a method for manufacturing such a strip seal. The weather strip seal includes a main leg made of a polymeric material, having one side and another side and terminating in first and second ends, a first sealing portion designed to press against the first structure and extending on the one side of the leg adjacent the first end, and a metal carrier for retaining the shape of the strip seal which has an asymmetrical substantially U-shaped cross-section having a first branch reinforcing a portion of the main leg and a second branch extending from the second end on the another side and terminating in a second sealing portion designed to sealingly press against the second structure. An ionomer tie layer is located between the metal surface and the at least one polymeric material.

20 Claims, 4 Drawing Sheets

WEATHER STRIP SEAL FOR AN AUTOMOTIVE VEHICLE, AND ITS MANUFACTURING METHOD

CROSS REFERENCE TO RELATED APPLICATIONS

This application claims priority to and is a nonprovisional application of U.S. Provisional Application No. 61/512,146, filed Jul. 27, 2011, which is incorporated by reference herein in its entirety.

FIELD OF THE INVENTION

The present invention relates to a weather strip seal for an automotive vehicle which is provided for sealing between a first structure and a second structure, and to a method for manufacturing such a strip seal. In particular, the field of the present invention is that of an extruded strip seal that combines the functions of a sealing strip and of a decorative trim and, even more particularly, the invention may advantageously concern an outer belt strip seal for an automobile vehicle with a bright bead decorative surface.

BACKGROUND OF THE INVENTION

Virtually all automotive vehicles have movable and/or fixed windows in their side doors, there being a requirement for various designs of weather strip seals to seal gaps between two body panel structures, such as a window pane and a door frame.

Many automotive vehicles also have decorative trims which are pigmented to blend, match or contrast with the color of the automotive vehicle body panels, and which are often used to conceal the strip seal since most seal strips are black due to the high amounts of carbon black used for the seal material. These decorative trim need a glossy or bright finish which can withstand the harsh environmental conditions which exist on the exterior of an automotive vehicle during extreme weather conditions or during high speed travel of the vehicle.

In a known manner and as visible in FIG. 1 showing the prior art, outer belt strip seals 1 with bright bead surfaces comprise a main polymeric leg 2 which is reinforced over its whole vertical width by a metal carrier 3 having an asymmetrical substantially U-shaped cross-section. This metal carrier 3 has a first branch 3a embedded in this leg 2, which is provided on one side thereof with flocked inner sealing lips 5 and 6 for sealing to the window pane, and a second branch 3b ending with a lower outer lip 7 for sealing with the door frame.

U.S. Pat. No. 6,422,571 discloses in its FIG. 3 an outer belt strip seal obtained by coextrusion, onto and around a metal carrier, of an elastomeric material such as an EPDM for both the main part of the leg and the inner sealing lips and of an ionomer material for an upper section of the leg and forming the outer bright decorative surface of the strip seal. Contrary to instant above-referred FIG. 1, both branches of the metal carrier are embedded in the strip seal, with in particular the second branch being entirely embedded in this ionomer material.

Current designs of outer belt strip seals with a bright bead, such as the one illustrated in FIG. 1, require:

as a first solution, a separate roll formed and finished decorative strip, with a bright bead that is attached to the sealing portion of the belt, or as a second solution illustrated in FIG. 1, a single sealing and decorative strip 1, where the embedded metal carrier 3 has an adhesive applied only to specific distinct areas 8a, 8b, 8c, 8d of the metal surface (the metal carrier 3 being said in this case to be "stripe coated" on areas 8a, 8b of its first branch 3a to which the polymeric material of the main leg 2 must adhere and further on areas 8c, 8d of its second branch 3b to which the elastomeric material of the lower lip 7 must also adhere), and afterwards this stripe coated metal carrier 3 is roll formed.

The main drawbacks of this first solution implying a two-piece design are that it is costly, involves a high amount of scrap and additional assembly time, and also an additional weight.

Concerning this second solution, the metal carrier 3, which is typically wide enough to reinforce the sealing portion 2, 5, 6 of the belt strip 1, travels through extrusion tooling where the main leg 2 and the outer sealing lip 7 are extruded onto areas 8a, 8b, 8c, 8d with the adhesive, leaving the bright decorative area exposed.

FIG. 2 shows a known manufacturing method of this strip seal 1, with the following successive steps:

a step 10 of stripe abrading the metal for the carrier 3,
a step 20 of stripe applying a primer to this abraded metal,
a step 30 of curing this metal with an applied primer,
a step 40 of stripe applying adhesive to the cured metal,
a step 50 of curing the stripe adhesive coated metal,
a step 60 of roll forming the cured stripe coated metal,
a step 70 of co-extruding the rigid and flexible polymeric materials respectively forming the main leg 2 and the sealing lips 5, 6, 7,
a step 80 of calibrating the obtained coextruded blank,
a step 90 of cooling the calibrated blank,
a step 100 of applying adhesive to the cooled blank,
a step 110 of applying a flock to both inner lips 5 and 6,
a step 120 of curing the seal with flocked inner lips 5, 6,
a step 130 of cutting off the cured seal to length, and
a step 140 of curing the cut-off seal.

The main drawbacks of this second solution with the stripe coating operations 10 to 50 for the metal carrier 3, apart from also being costly and involving a high amount of scrap, are that these operations produce volatile organic compounds (VOC's) and require a wider stock.

OBJECTS AND SUMMARY OF THE INVENTION

It is an object of the present invention to provide a strip seal for a motor vehicle, which may be advantageously coextruded and remedies the aforementioned drawbacks and in particular eliminates the requirement of stripe coating the metal carrier.

It is also an object of the present invention to provide such a strip seal which functions as both a sealing strip and decorative trim.

An additional object of the present invention is to provide such a strip seal with a reduced weight due to a narrower metal carrier.

It is further an object of the present invention to provide a manufacturing method for such a strip seal which involves a lower product cost due to elimination of this stripe coating operations and also due to a reduction in the metal carrier width, compared to the product cost of the known strip seals with stripe coating operations applied to a wider carrier.

Another object of the present invention is to provide for this manufacturing method both a reduced scrap and a higher product quality compared to these known strip seals having uneven overlapping lines of stripe coated adhesive.

Still another object of the present invention is to provide for this manufacturing method the elimination of volatile organic compounds which are present in the known manufacturing methods using stripe coating.

A weather strip seal for an automotive vehicle of the invention is provided for sealing between first and second structures and comprises:

a main leg made of at least one polymeric material, said main leg having one side and another side and terminating in a first end and second end, a first sealing portion which is designed to sealingly press against said first structure and which extends on said one side of said main leg adjacent said first end, and a metal carrier for retaining the shape of said strip seal which has an asymmetrical substantially U-shaped cross-section having a first branch which reinforces at least one portion of said main leg and a second branch which extends from said second end on said another side and terminates in a second sealing portion designed to sealingly press against said second structure, said metal carrier having a metal surface.

To achieve all the above-recited objects in this strip seal of the invention, said metal carrier is provided on at least said first branch with at least one ionomer tie layer located between said metal surface and said at least one polymeric material, which makes the latter adhere to said metal surface.

Advantageously, said at least one ionomer tie layer may consist of a single continuous layer coextruded with said at least one polymeric material onto said metal carrier, said ionomer tie layer preferably having a thickness of between 0.1 mm and 0.3 mm.

Also advantageously, the metal surface is devoid of any stripe coating adhesive to make it adhere to said at least one polymeric material.

Preferably, said ionomer tie layer is based on at least one metal salt ionomer consisting of a metal salt of ethylenemethacrylic acid (E/MAA), even more preferably a zinc salt of said acid.

According to a preferred embodiment of the invention, said at least one polymeric material comprises:

at least one rigid thermoplastic material which extends along said main leg from said first end to an end section of said first branch by adhesively surrounding said end section by intercalation of said ionomer tie layer, and at least one flexible elastomeric material which forms an intermediate sealing portion of said main leg adjacent said second end, said intermediate sealing portion adhering to said first branch by intercalation of said ionomer tie layer and extending on said one side of said main leg so as to be in contact with said first sealing portion when the latter sealingly presses against said first structure.

Advantageously, said metal carrier may not be embedded in said main leg except in said end section of said first branch, so that said first branch defines said another side of said main leg between said end section and said second end of said main leg.

Also advantageously, said at least one flexible elastomeric material may also constitute said first sealing portion.

According to another feature of the invention, said first sealing portion may comprise at least two primary sealing flocked lips which are designed to sealingly press against said first structure, one of which, or primary lower lip, extending adjacent said first end and the other one of which, or primary upper lip, extending between said first end and said second end and terminating in a secondary upper lip which is directed toward said one side facing said second end and which may be coated with a low friction coextruded coating.

According to still another feature of the invention, said intermediate sealing portion has a surface defining said one side of said main leg upwards from said at least one rigid thermoplastic material, and this intermediate sealing portion may terminate in an upper sealing lip being in contact with said secondary upper lip when said upper primary lip sealingly presses against said first structure.

Preferably, said at least one rigid thermoplastic material is based on at least one polyolefin which is preferably polypropylene, and further comprises an inorganic filler which is preferably talc.

Still preferably, said at least one flexible elastomeric material is based on at least one elastomer selected from the group consisting of ethylene-propylene-diene rubbers (EPDM) and thermoplastic elastomers (TPE) and, even more preferably, is based on a thermoplastic elastomer (TPE) selected from the group consisting of thermoplastic vulcanizates (TPV) and styrene block thermoplastic elastomers (TPS).

Advantageously, said at least one portion of the leg which is reinforced by said first branch of the metal carrier may have a width, viewed in a cross-section of the strip seal, which is less than the half-width of the leg.

Also advantageously, said end section of said first branch may be curved substantially at right angle toward said one side of said main leg, said end section being preferably provided inside a bead section of said main leg which is formed by said at least one rigid thermoplastic material.

In a preferred embodiment of the invention, the weather strip seal forms an outer belt strip seal, the first structure being a window pane of the vehicle, the second structure being a door frame outside the window pane, and the first end and second end of the main leg respectively forming lower and upper ends of the strip seal. Even more preferably, the first branch of the metal carrier extends in a substantially straight manner over said at least one portion of the main leg with a width, viewed in a cross-section of the strip seal, which is less than the third part of the main leg width, the second branch extending in a curved manner from the first branch and terminating in a lower sealing lip forming the second sealing portion.

Advantageously, said second sealing portion may be made of an ionomer material which directly coats both faces of a curved end of said second branch and which is preferably the same as that of said tie layer.

The method of the invention for manufacturing said weather strip seal comprises the following steps:

a) roll forming said metal carrier, and b) coextruding the ionomer tie layer onto the roll formed carrier over said at least one portion of the main leg, and said at least one polymeric material onto the ionomer tie layer and around said portion, so that the coextruded ionomer tie layer makes said at least one polymeric material adhere to the metal carrier, a seal blank being obtained by this coextrusion.

According to a preferred embodiment of the invention, this method further comprises, after steps a) and b):

c) calibrating this co-extruded strip seal blank, d) cooling the calibrated strip seal blank, so that it keeps its final configuration, and e) curing and cutting to length the strip seal thus obtained.

BRIEF DESCRIPTION OF THE DRAWINGS

Other advantages, characteristics, and details of the invention appear from the following additional description with reference to the accompanying drawings, given purely by way of example, and in which.

MORE DETAILED DESCRIPTION

Figure 1:
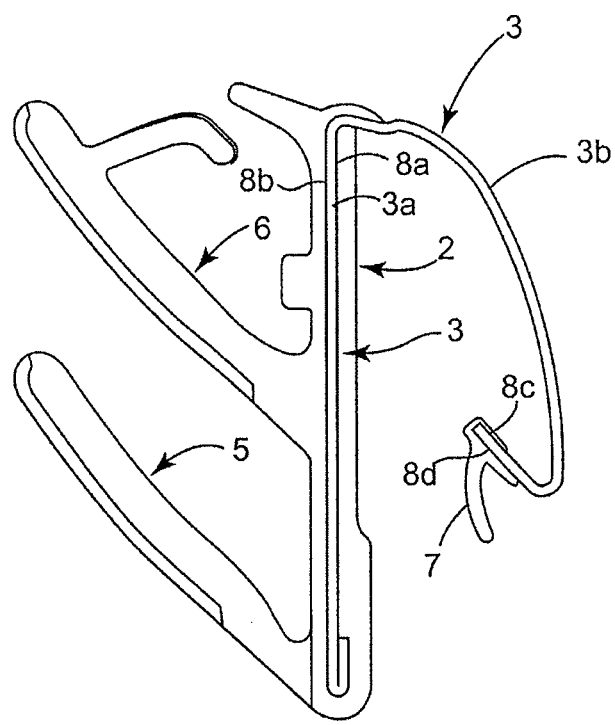
FIG. 1 is a cross-sectional view of an outer belt strip seal for a side window of a motor vehicle, according to the prior art.
Figure 2:
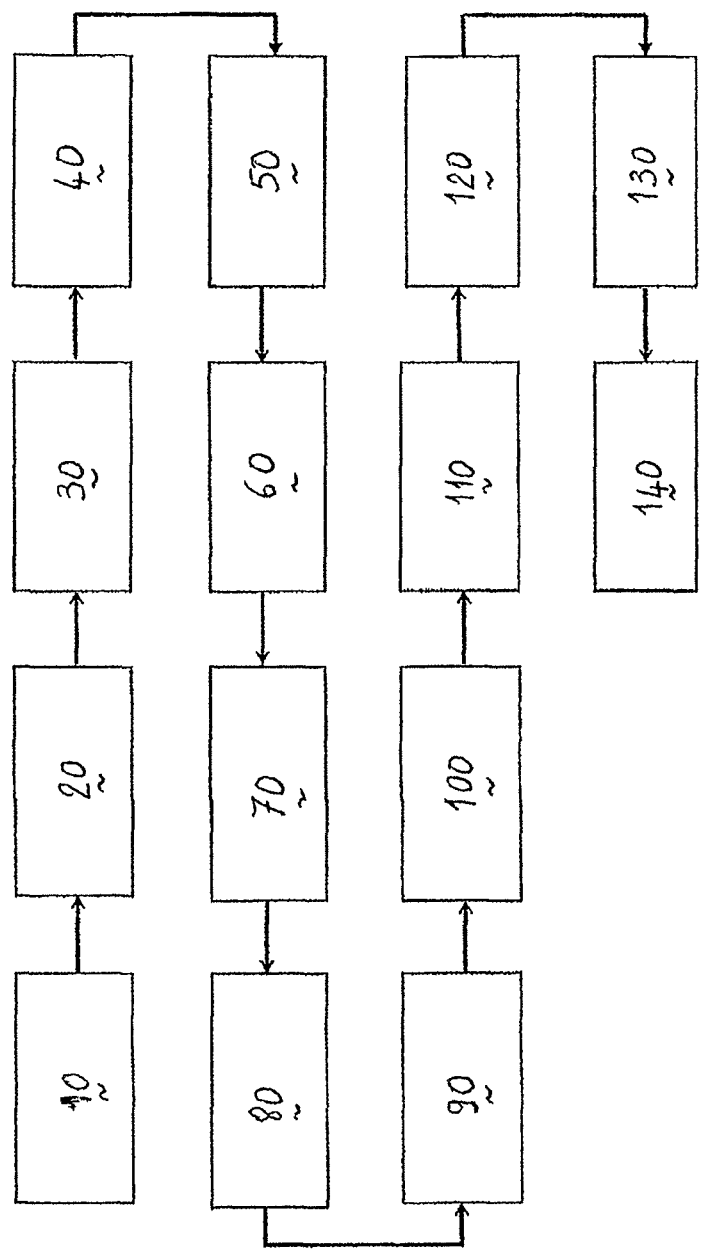
FIG. 2 is a block diagram of the prior art showing the main steps for manufacturing an outer belt strip seal such as that of FIG. 1.
Figure 3:
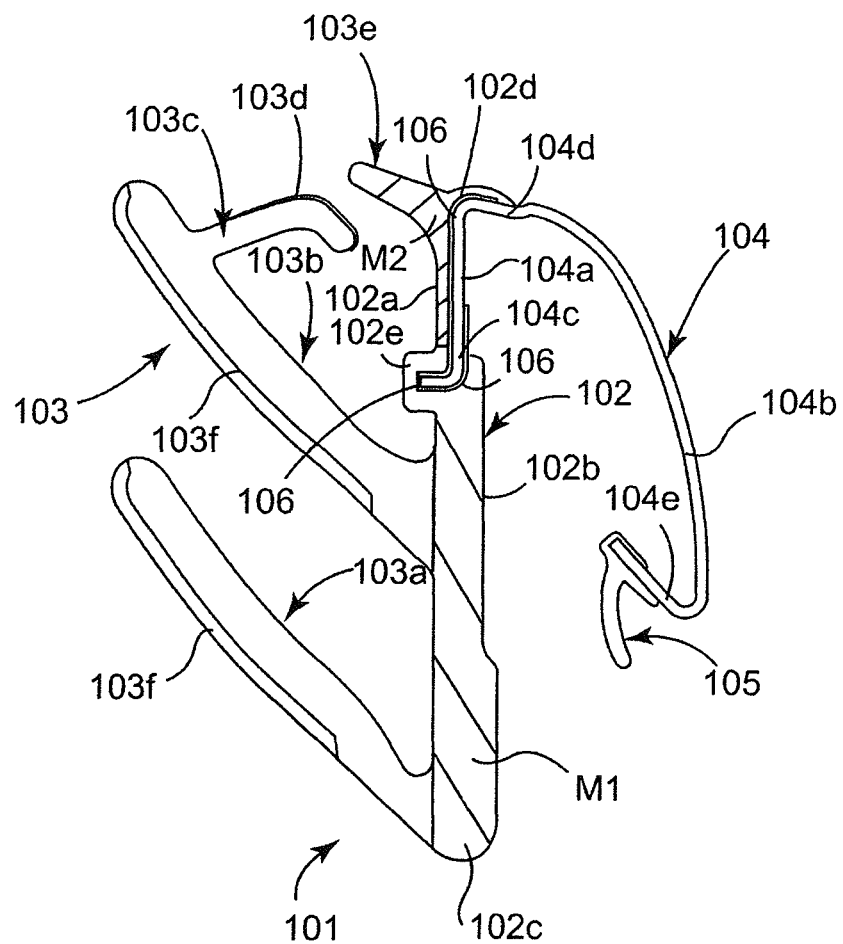
FIG. 3 is a cross-sectional view of an outer belt strip seal for a side window of a motor vehicle according to an embodiment of the invention.

The strip seal 101 of instant FIG. 3 is for an outer belt such as the outer belt identified in FIG. 1 of U.S. Pat. No. 6,422,571 showing its well-known location for example on a front door of an automotive vehicle.

Referring to instant FIG. 3, the coextruded outer belt strip seal 101 of the invention is provided for sealing between a window pane of the vehicle and a door frame outside the window pane, and comprises:

a vertical main leg 102 having an inner side 102a directed toward the window pane and an outer side 102b directed toward the door frame and terminating in a lower end 102c and upper end 102d, the leg 102 being made from its lower end 102c to a bead section 102e adjacent its upper end 102d of a rigid polyolefin material M1, an inner elastomeric sealing portion 103 which extends on the inner side 102a of leg 102 to sealingly press against the window pane, this portion 103 having a lower flocked lip 103a obliquely extending from the lower end 102c and an upper flocked lip 103b which obliquely extends adjacent and from below the bead section 102e and which terminates in a secondary upper lip 103c formed on its upper non flocked surface, this secondary lip 103c being directed toward the inner side 102a to face the upper end 102d and being coated on its upper surface with a low friction coextruded coating 103d to be in contact in operation with a flexible elastomeric intermediate upper lip 103e formed on the inner side 102a of the upper end 102d, and a metal carrier 104 having an asymmetrical U-shaped cross-section having an inner first branch 104a which reinforces only an upper portion of leg 102 extending from its bead section 102e to its upper end 102d, and an outer second branch 104b which extends from the upper end 102d toward the outside and terminates in an outer lower sealing lip 105 designed to press against the door frame.

According to the invention, the metal carrier 104 is provided on its inner branch 104a with a coextruded continuous ionomer tie layer 106 located between its metal surface 104 and both the rigid polyolefin material M1 of leg 102 and the flexible elastomeric material M2 of the upper lip 103e, this tie layer 106 having a thickness of about 0.2 mm and being coextruded with both materials M1 and M2 onto the metal carrier 104 and making them adhere to this metal surface without any application of a stripe coating adhesive.

More precisely, the inner branch 104a of metal carrier 104 extends in a straight vertical manner over the upper portion of leg 102 ending at the bead section 102e, which is defined by a protrusion provided on the inner face 102a of leg 102 and in which bead section 102e, made of a rigid polyolefin material, is embedded an end section 104c of the inner branch 104a.

This end section 104c is curved at right angle toward the inner side 102a of leg 102 and the ionomer tie layer 106 covers the whole metal surface 104 of this curved end section 104c. As visible in FIG. 3, the rigid polyolefin material M1 adhesively surrounds the end section 104c at the bead section 102e by intercalation of the ionomer tie layer 106. And upwards from this bead section 102e (i.e. in the upper portion of leg 102 made of the flexible elastomeric material M2), the inner branch 104a is not embedded in this flexible material M2 but is covered by it on its inner face so that this inner branch 104a defines the outer side 102b of leg 102 between the bead section 102e and the upper end 102d.

As also shown by FIG. 3, the inner face of inner branch 104a is continuously covered by the ionomer tie layer 106 from its end section 104c to the upper end 102d, which tie layer 106 is in turn covered by the flexible elastomeric material M2 in the shape of a flat coating ending in the intermediate upper lip 103e directed inwards. This intermediate upper lip 103e further coats, with the continuous intercalation of the same ionomer tie layer 106, a curved upper section or summit 104d of the U-shaped metal carrier 104 which connects its inner and outer branches 104a and 104b together.

According to an advantageous aspect of the invention, the inner branch 104a has a cross-sectional vertical width which is very small, compared to the total vertical width of leg 102, being preferably less than the third part of the total leg width. It is to be noted that the rigid polyolefin material M1 of the portion of leg 102 extending from its lower end 102c to its bead section 102e thus acts as the major reinforcement for the leg 102 to support the inner sealing lips 103a and 103b.

As for the outer branch 104b of the metal carrier 104, it extends in a curved manner from the summit 104d and terminates in an inward curved part 104e supporting the outer lower sealing lip 105, which lip 105 is made of an ionomer material—for example the same as that of the tie layer 106—directly and continuously coating both faces of this curved part 104e (i.e. by means of no adhesive intermediate layer).

This ionomer tie layer 106 and outer lower sealing lip 105 are based on a metal salt ionomer (i.e. by a polymer with covalent bonds between the elements of the chain and ionic bonds between the chains) which is preferably a zinc salt of ethylene-methacrylic acid (E/MAA), although other salts are usable. By way of non-limiting examples, may be used ionomers having a Durometer Hardness Shore D ranging from 30 to 65, measured according to ASTM D2240 standard. Mention may be made for instance of ionomers sold by A. Schulman under the trade name "Clarix" or by Dupont under the trade name "Surlyn".

The outer lower sealing lip 105 was made of the same ionomer material as that of this tie layer 106, i.e. such as said zinc salt (this ionomer possibly being pigmented to match, contrast or blend with the remainder of the vehicle body).

The metal used for the carrier 104 was a "436 M2" stainless steel.

The rigid polyolefin based material M1 used for the major part of leg 102 was a polypropylene sold under the trade name "Salflex 620TC", and this polypropylene was filled with 20%-30% of an inorganic filler, such as talc, and further comprised "Sequel E5000" and "Hostacom" as other ingredients.

The flexible elastomeric material M2 used for the intermediate upper lip 103e adhering to the ionomer tie layer 106—and also for example for both the lower and upper sealing lips 103a and 103b—was a TPV (such as "Vegaprene" sold by Hutchinson, "Sarlink" sold by Teknor Apex or "Santoprene" sold by Exxon Mobil), although a TPS (such as a SEBS, i.e.

a block terpolymer styrene-ethylene-butadiene-styrene) or even an usual rubber such as an EPDM may be used to adhere to this tie layer 106.

The flock material 103f used for each lower and upper sealing lip 103a and 103b was a "SwissFlock" polyester flock.

The low friction coextruded coating 103d ("LFCC") of the secondary lip 103c was a TPV sold by Exxon Mobil under the trade name "Santoprene 8123-45S100".

Figure 4:
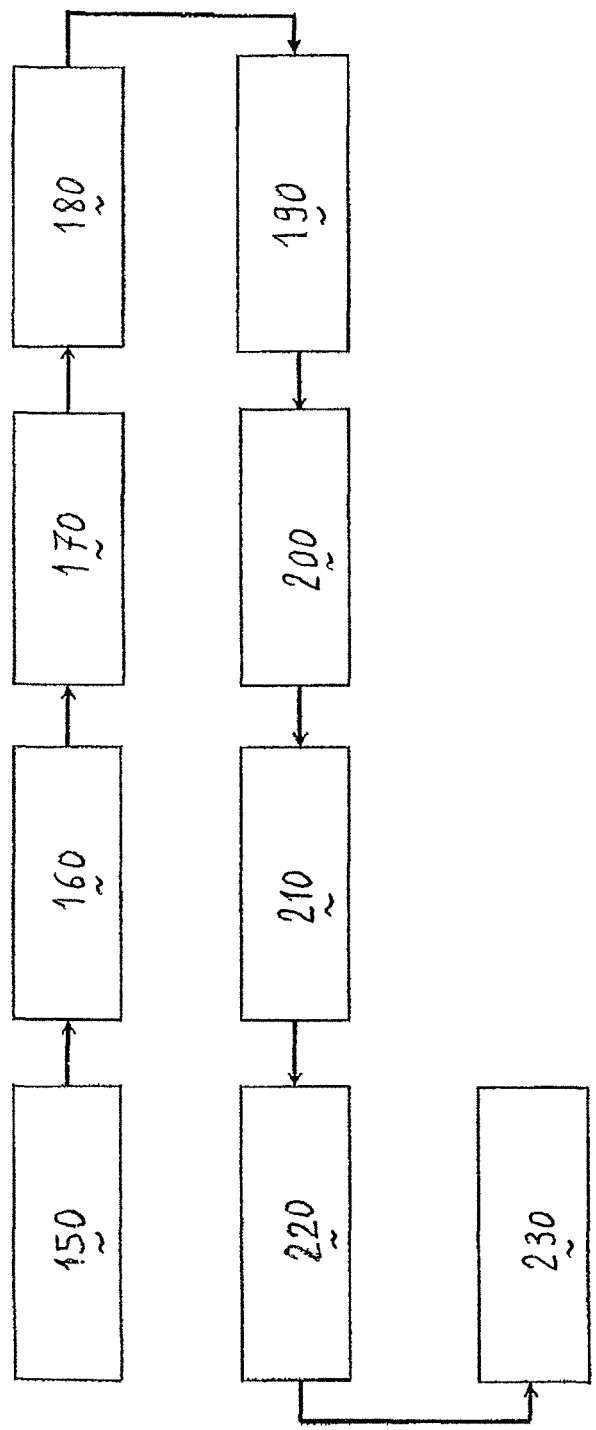
FIG. 4 is a block diagram of the invention showing the main steps for manufacturing an outer belt strip seal such as that of FIG. 3.

FIG. 4 shows the inventive manufacturing method of such a strip seal 101 according to the invention, with the following successive steps:
- a step 150 of roll forming the metal,
- a step 160 of coextruding the ionomer material 106/flexible elastomeric material M2/rigid polyolefin material M1 onto the roll formed metal 104,
- a step 170 of calibrating the obtained coextruded blank,
- a step 180 of cooling the calibrated blank,
- a step 190 of applying adhesive to the cooled blank,
- a step 200 of applying a flock 103f to both inner lips 103a and 103b,
- a step 210 of curing the seal with flocked inner lips 103a and 103b,
- a step 220 of cutting off the cured seal to length, and
- a step 230 of curing the cut-off seal 101.

As explained above, this inventive method in particular allows to do without any stripe coating operation applied to the metal carrier 104, with all the recited advantages.

While the invention has been described in connection with specific embodiments thereof, it is evident that many alternatives, modifications, and variations will be apparent to those skilled in the art in light of the foregoing description. Accordingly, it is intended to embrace all such alternatives, modifications and variations that fall within the spirit and broad scope of the appended claims.

What is claimed is:

1. A weather strip seal for an automotive vehicle which is provided for sealing between a first structure and a second structure and which comprises:
    a main leg made of at least one polymeric material, said main leg having one side and another side and terminating in a first end and second end,
    a first sealing portion which is designed to sealingly press against said first structure and which extends on said one side of said main leg adjacent said first end, and
    a metal carrier for retaining the shape of said strip seal which has an asymmetrical substantially U-shaped transverse cross-section having a first branch which reinforces at least one portion of said main leg and a second branch which extends from said second end on said another side and terminates in a second sealing portion designed to sealingly press against said second structure, said metal carrier having a metal surface,
    wherein said metal carrier is provided on at least said first branch with at least one ionomer tie layer located between said metal surface and said at least one polymeric material, which makes the latter adhere to said metal surface
    wherein said at least one portion of the main leg that said first branch of the metal carrier reinforces only consists of an upper portion of the main leg, and
    wherein said at least one polymeric material comprise at least one rigid thermoplastic material which extends from said first end of the main leg and at least one flexible elastomeric material which extends in said upper portion from said second and of the main leg, said at least one ionomer tie layer making said metal surface adhere to said rigid thermoplastic material and to said flexible elastomeric material.

2. The weather strip seal according to claim 1, wherein said at least one ionomer tie layer consists of a single continuous layer coextruded with said at least one polymeric material onto said metal carrier, said ionomer tie layer having a thickness of between 0.1 mm and 0.3 mm.

3. The weather strip seal according to claim 1, wherein said metal surface is devoid of any stripe coating adhesive to make it adhere to said at least one polymeric material.

4. The weather strip seal according to claim 1, wherein said at least one ionomer tie layer is based on at least one metal salt ionomer consisting of a metal salt of ethylene-methacrylic acid (E/MAA).

5. The weather strip seal according to claim 1, wherein said at least one ionomer tie layer is based on at least one metal salt ionomer consisting of a zinc salt of ethylene-methacrylic acid (E/MAA).

6. The weather strip seal according to claim 1, wherein:
    said at least one rigid thermoplastic material extends along said main leg from said first end to an end section of said first branch by adhesively surrounding said end section by intercalation of said at least one ionomer tie layer, and wherein
    said at least one flexible elastomeric material forms an intermediate sealing portion of said main leg adjacent said second end, said intermediate sealing portion adhering to said first branch by intercalation of said at least one ionomer tie layer and extending on said one side of said main leg so as to be in contact with said first sealing portion when the latter sealingly presses against said first structure.

7. The weather strip seal according to claim 6, wherein said metal carrier is not embedded in said main leg except in said end section of said first branch, so that said first branch defines said another side of said main leg between said end section and said second end of said main leg.

8. A weather strip seal according to claim 6, wherein said at least one flexible elastomeric material also constitutes said first sealing portion.

9. A weather strip seal according to claim 1, wherein said first sealing portion comprises at least two primary sealing flocked lips which are designed to sealingly press against said first structure, one of which, or primary lower lip, extending adjacent said first end and the other one of which, or primary upper lip, extending between said first end and said second end and terminating in a secondary upper lip which is directed toward said one side facing said second end and which is coated with a low friction coextruded coating.

10. A weather strip seal according to claim 6, wherein said first sealing portion comprises at least two primary sealing flocked lips which are designed to sealingly press against said first structure, one of which, or primary lower lip, extending adjacent said first end and the other one of which, or primary upper lip, extending between said first end and said second end and terminating in a secondary upper lip which is directed toward said one side facing said second end and which is coated with a low friction coextruded coating, and wherein said intermediate sealing portion has a surface defining said one side of said main leg upwards from said at least one rigid thermoplastic material, and terminates in an upper sealing lip being in contact with said secondary upper lip when said upper primary lip sealingly presses against said first structure.

11. A weather strip seal according to claim 6, wherein said at least one rigid thermoplastic material is based on at least one polyolefin which comprises polypropylene, and further comprises an inorganic filler which is talc.

12. A weather strip seal according to claim 6, wherein said at least one flexible elastomeric material is based on at least one elastomer selected from the group consisting of ethylene-propylene-diene rubbers (EPDM) and thermoplastic elastomers (TPE).

13. A weather strip seal according to claim 12, wherein said at least one flexible elastomeric material is based on a thermoplastic elastomer (TPE) selected from the group consisting of thermoplastic vulcanizates (TPV) and styrene block thermoplastic elastomers (TPS).

14. A weather strip seal according to claim 1, wherein said at least one portion of said main leg which is reinforced by said first branch of said metal carrier has a width, viewed in a transverse cross-section of said weather strip seal, which is less than the half-width of said main leg.

15. A weather strip seal according to claim 6, wherein said end section of said first branch is curved substantially at right angle toward said one side of said main leg, said end section being provided inside a bead section of said main leg which is formed by said at least one rigid thermoplastic material, wherein said at least one portion of said main leg which is reinforced by said first branch of said metal carrier has a width, viewed in a transverse cross-section of said weather strip seal, which is less than the half-width of said main leg.

16. A weather strip seal according to claim 1, wherein it forms an outer belt strip seal, said first structure being a window pane of said vehicle, said second structure being a door frame outside said window pane, and said first end and second end of said main leg respectively forming lower and upper ends of said strip seal.

17. A weather strip seal according to claim 16, wherein said first branch of said metal carrier extends in a substantially straight manner over said at least one portion of said main leg with a width, viewed in a transverse cross-section of said weather strip seal, which is less than the third part of the width of said main leg, said second branch extending in a curved manner from said first branch and terminating in a lower sealing lip forming said second sealing portion.

18. A weather strip seal according to claim 1, wherein said second sealing portion is made of an ionomer material which directly coats both faces of a curved end of said second branch and which is preferably the same as that of said at least one ionomer tie layer.

19. Method for manufacturing a weather strip seal for a motor vehicle according to claim 1, wherein it comprises the following steps:
 a) roll forming said metal carrier, and
 b) coextruding said at least one ionomer tie layer onto the roll formed metal carrier over said at least one portion of said main leg, and said at least one polymeric material onto said at least one ionomer tie layer and around said portion, so that this coextruded ionomer tie layer makes said at least one polymeric material adhere to said metal carrier, a strip seal blank being obtained by this coextrusion.

20. Method for manufacturing a weather strip seal according to claim 19, wherein it further comprises, after steps a) and b):
 c) calibrating this co-extruded strip seal blank,
 d) cooling the calibrated strip seal blank, so that it keeps its final configuration, and
 e) curing and cutting the strip seal thus obtained to the required length.

* * * * *